United States Patent [19]
LacValle

[11] 3,724,264
[45] Apr. 3, 1973

[54] METHODS OF TESTING THE STRENGTH OF WIRE BONDS IN ELECTRICAL COMPONENTS

[75] Inventor: Thomas Alvin LaValle, Annapolis, Md.

[73] Assignee: Western Electric Company Incorporated, New York, N.Y.

[22] Filed: Aug. 13, 1971

[21] Appl. No.: 171,543

Related U.S. Application Data

[62] Division of Ser. No. 878,017, Nov. 19, 1969, Pat. No. 3,618,204.

[52] U.S. Cl. ..................73/88 B, 73/95, 29/593, 29/407
[51] Int. Cl. ...............................................G01b 5/30
[58] Field of Search.29/593, 427, 407, 244, DIG. 42, 29/DIG. 48, 484, 33 F; 73/88, 95, 95.5, 143, 144; 140/111, 112

[56] References Cited

UNITED STATES PATENTS

| 2,100,502 | 11/1937 | Campbell et al. | 29/33 |
| 3,473,213 | 10/1969 | Brown | 29/203 |
| 2,453,576 | 11/1948 | Jacob | 73/95 |
| 2,316,597 | 4/1943 | Kershaw | 73/88 R |
| 2,268,815 | 1/1942 | Funk | 73/88 R |
| 2,606,268 | 8/1952 | Pityo et al. | 219/10 |
| 2,782,635 | 2/1957 | Knight | 73/88 R |

Primary Examiner—Charles W. Lanham
Assistant Examiner—D. C. Crane
Attorney—W. M. Kain et al.

[57] ABSTRACT

A rotatable turntable having a plurality of workholders spaced about the periphery thereof is indexed to advance each of the workholders successively through each of a plurality of work stations positioned adjacent the periphery of the turntable to assemble electrical components. A first part positioned in one of the workholders has the leading end of an insulated wire welded thereto. The first part is rotated in the workholder while tensioning the wire extending from and secured to the first part to wind the wire thereon as the workholder is advanced with the turntable through a work station where a second part is assembled to the first part and, simultaneously, the insulation on a portion of the wire extending from the first part is stripped. The trailing portion of the wire is welded to a metal cap which is secured to the second part. As the weld is made, a test device mounted pivotally on a welding electrode is caused to be moved transversely of the path of the electrode. Then, when the electrode is retracted, the test device engages the wire imparting a force thereto and testing the strength of the weld.

2 Claims, 28 Drawing Figures

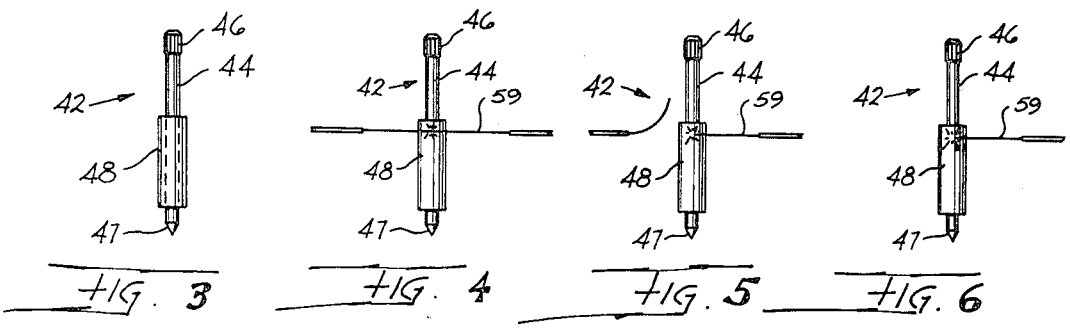
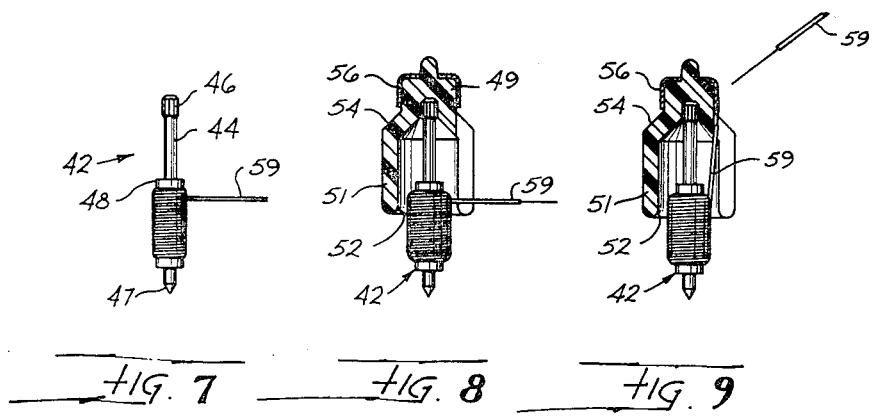
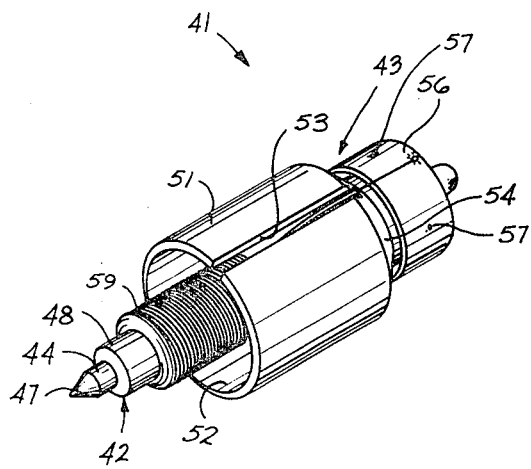
INVENTOR
T. A. LA VALLE
BY E. W. Somers
ATTORNEY

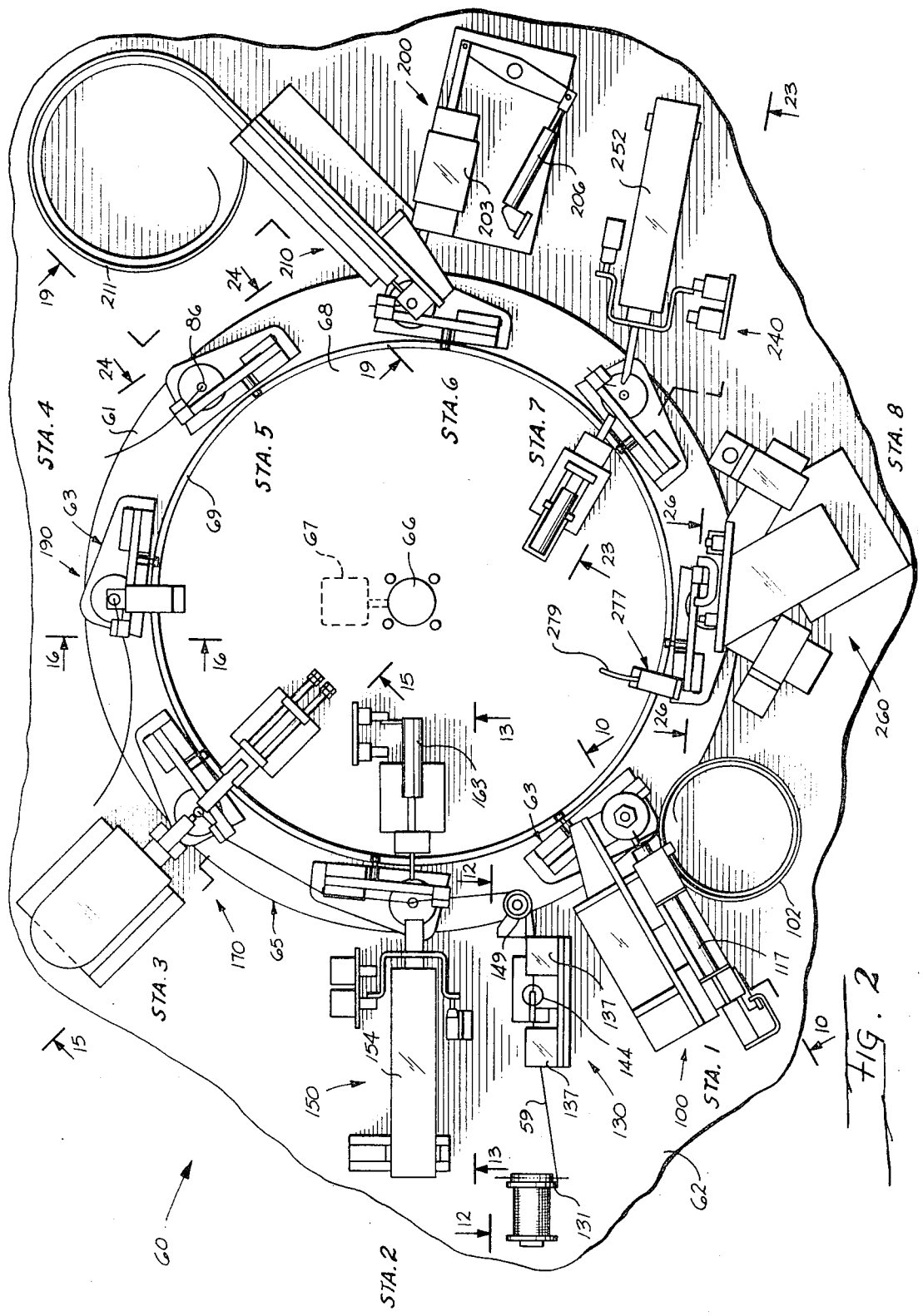

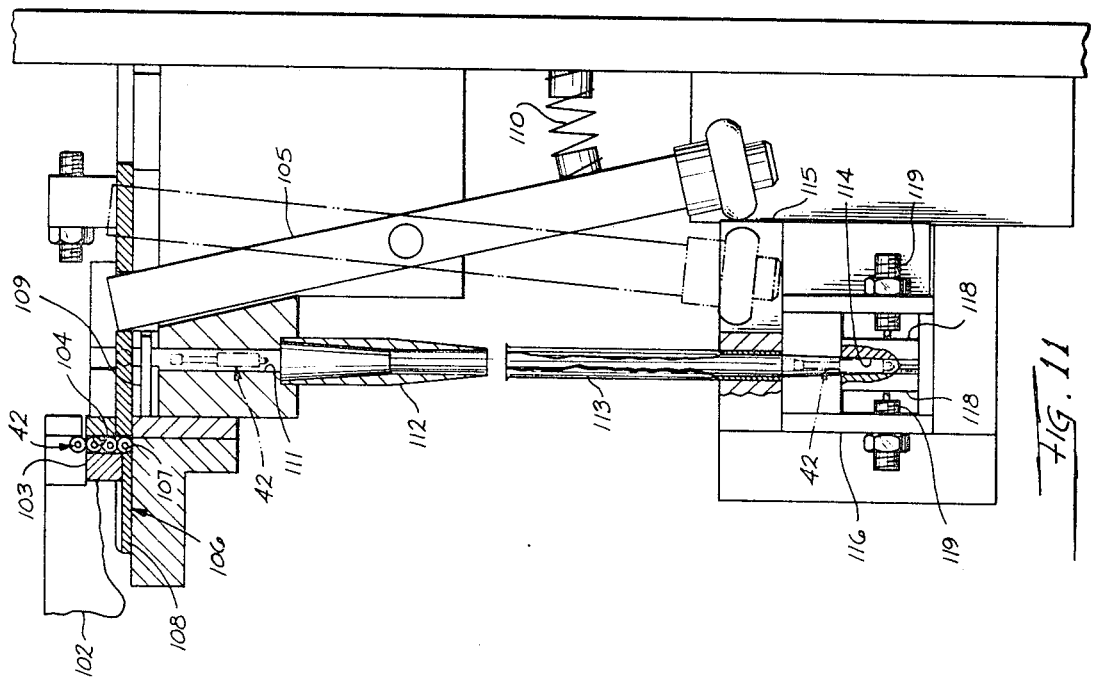
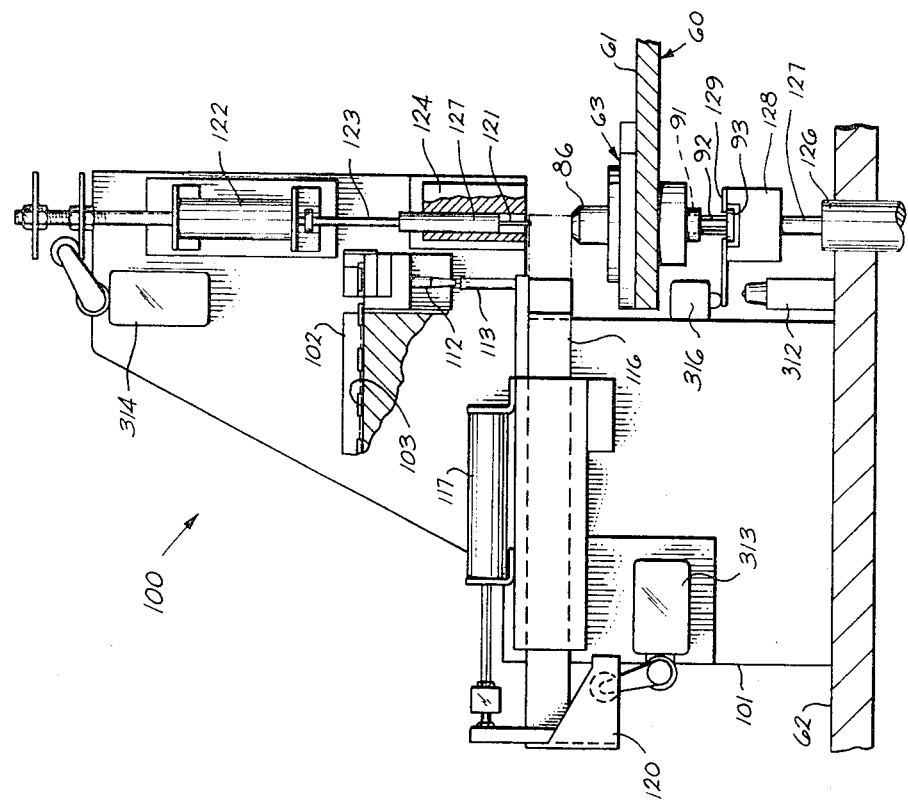

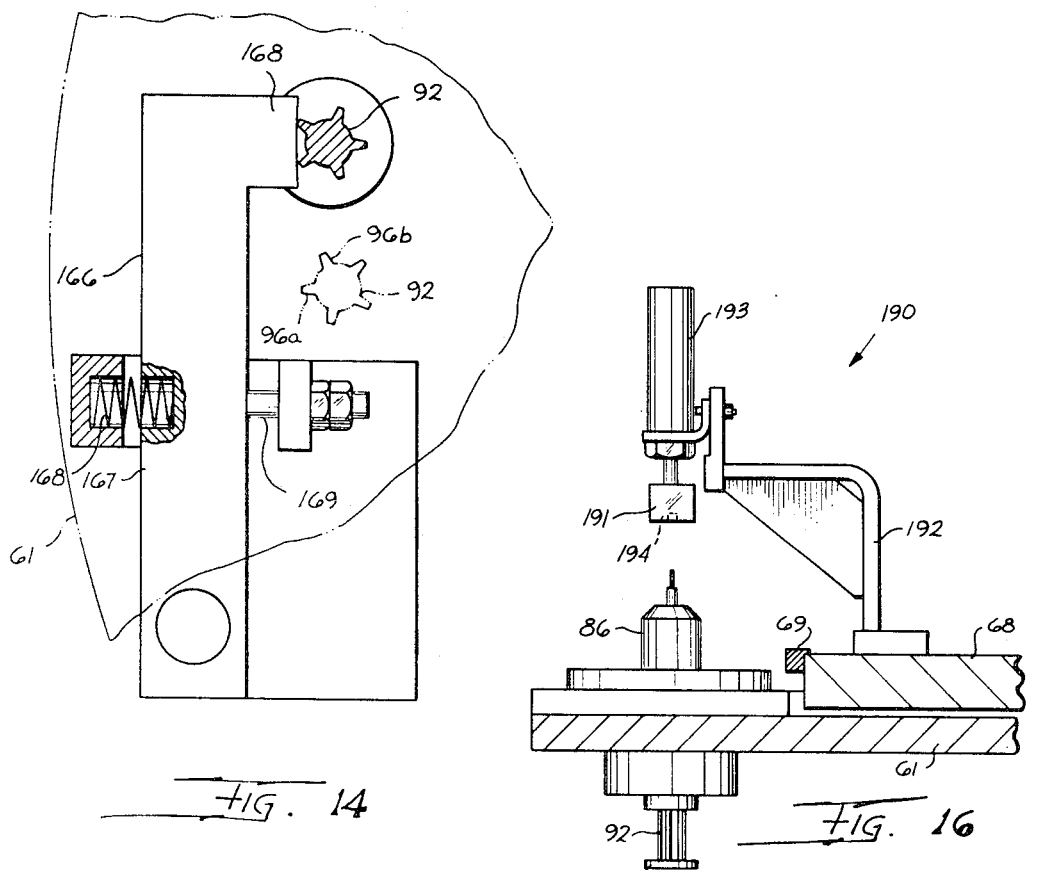
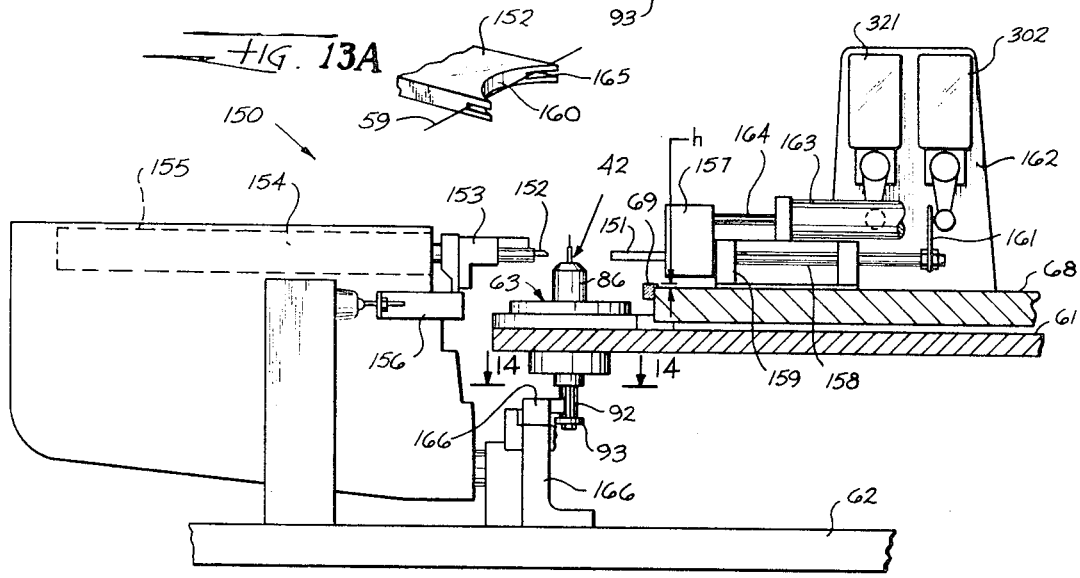

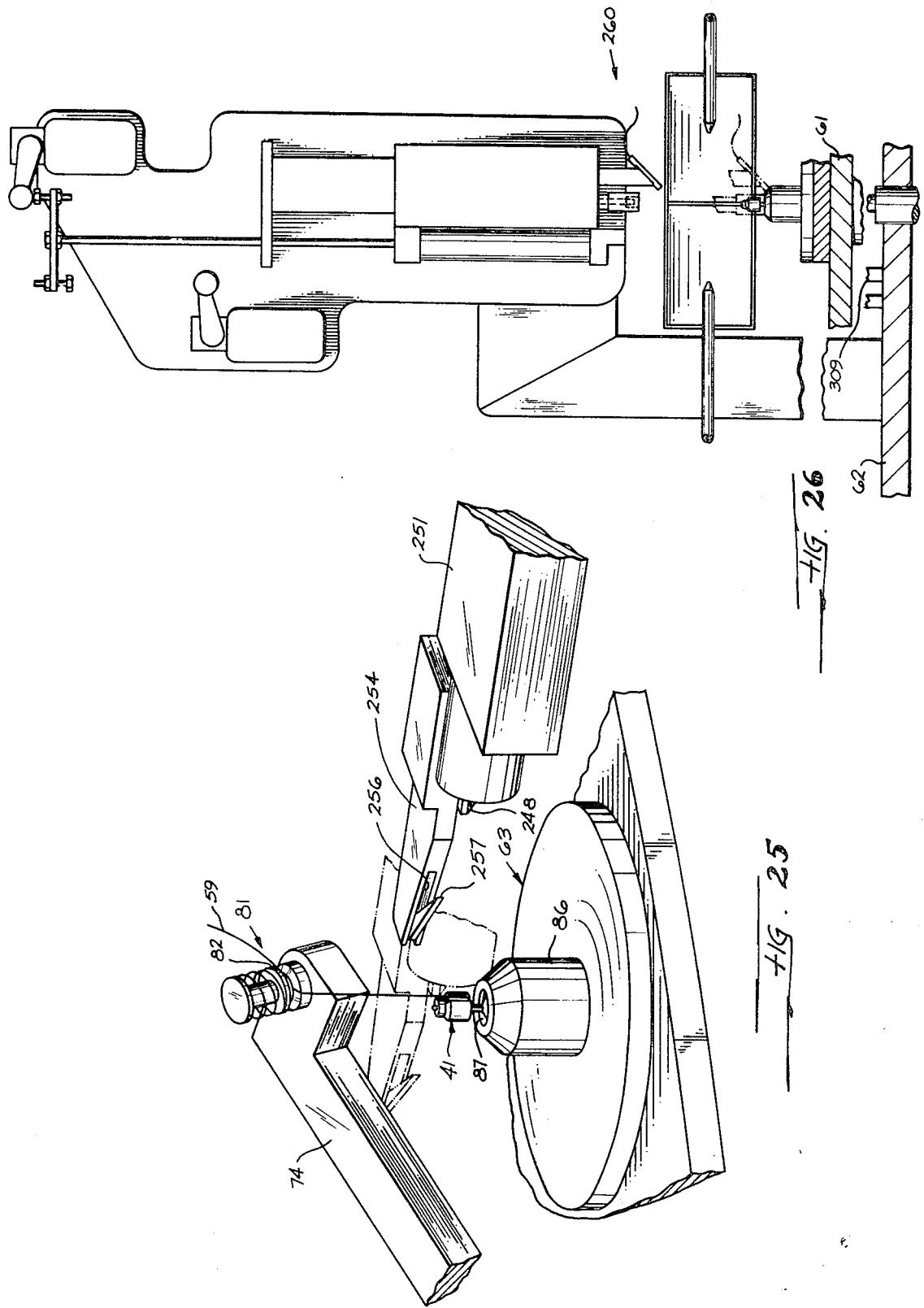

METHODS OF TESTING THE STRENGTH OF WIRE BONDS IN ELECTRICAL COMPONENTS

CROSS-REFERENCE TO RELATED APPLICATION

This is a division of application Ser. No. 878,017, filed Nov. 19, 1969 now U.S. Pat. No. 3,618,204, issued Nov. 9, 1971.

BACKGROUND OF THE INVENTION

1. Field of the Invention

This invention relates to methods of testing electrical components and, more particularly, to methods of advancing successive ones of a mass of first parts on an indexable turntable and assembling successive ones of a mass of second parts to successive ones of the first parts and for connecting electrically each assembly of first and second parts to form an electrical component assembly, with each of the connections being tested.

2. Description of the Prior Art

In the manufacturing of electrical components, first parts and second parts must be fabricated and assembled together. For example, in the manufacture of heat coils which are used in central offices in incoming telephone lines to ground out overload currents before these currents damage the equipment in the central office, a bared leading end of an insulated filamentary wire must have a portion thereof welded to a sleeve of a pin and sleeve subassembly and then the wire must be wound around the pin and sleeve subassembly. The trailing end of the wire must be stripped of insulation and welded to a metal cap attached to a plastic shell which has been positioned over the pin and sleeve subassembly. Welding stations are provided in prior art apparatus for welding the leading and the trailing ends of each length of wire to the sleeve of the pin and sleeve subassembly and to the metal cap, respectively. However, no facilities were provided in these apparatus for strength testing the weld of the trailing end of the wire to the cap.

SUMMARY OF THE INVENTION

It is an object of this invention to provide new and improved methods of testing automatically electrical components.

Still another object of this invention is to provide new and improved methods of testing the strength of a joint between a portion of a length of wire bonded to a part.

With these and other objects in mind, the present invention contemplates a method of testing the strength of a joint of a portion of a length of wire bonded to a part with a test device in which the wire is held to support a section of the length of the wire extending from the joint. The test device is mounted for transverse and longitudinal movement for engaging the section of the length of wire extending between the joint and the end of the wire. Then the test device is moved longitudinally in a path of travel transversely of the length of wire after which the test device is moved pivotally transversely of the longitudinal path of travel so that when the test device is moved longitudinally and transversely of the wire, the test device exerts a pulling force against the wire of sufficient magnitude to test the joint and break the wire.

BRIEF DESCRIPTION OF THE DRAWINGS

Other objects and features of the present invention will be more readily understood from the following detailed description of specific embodiments thereof when read in conjunction with the appended drawings, in which:

FIG. 1 is a perspective view of a heat coil showing a pin and sleeve subassembly which is tested by the principles of the methods of this invention.

FIG. 2 is a plan view of an apparatus which includes a rotatably mounted circular turntable having a plurality of workholders arrayed about the circumferential edge thereof for advancing each of the workholders successively through each of a plurality of work stations for assembling a pin and sleeve subassembly with a shell and cap subassembly to assemble a heat coil;

FIGS. 3 through 9 are a series of enlarged elevational views of the heat coil in various stages of assembly beginning with the pin and sleeve subassembly which is advanced through the work stations to have one end of a conductor wire welded thereto, then to have a shell and cap subassembly placed thereover and another end of the conductor wire welded to the cap of the shell and cap subassembly;

FIG. 10 is an enlarged sectional view of a pin and sleeve subassembly feed device of the apparatus of FIG. 2 taken along line 10—10 thereof with portions broken away for purposes of clarity;

FIG. 11 is an enlarged detailed view of the pin and sleeve subassembly feed device of FIG. 10 showing the movement of successive pin and sleeve subassemblies from a vibratory bowl feeder to a placement slide for pushing the pin and sleeve subassemblies over the workholder in registration with that station;

FIG. 13 is an enlarged sectional view of a welding device of the apparatus of FIG. 2 taken along line 13—13 thereof;

FIG. 13A is an enlarged perspective view of a portion of a welding electrode of the welding device of FIG. 13;

FIG. 14 is an enlarged sectional view of the welding station of FIG. 13 taken along line 14—14 thereof which illustrates a pinion orienter located on the underside of the turntable at the welding station for orienting the pinion attached to a shaft extending from below the workholder and which engages subsequently a rack for turning the workholder and the pin and sleeve subassembly held therein to facilitate winding the wire on the sleeve of the pin and sleeve subassembly;

FIG. 16 is an enlarged sectional view of a swaging station of the apparatus of FIG. 2 taken along line 16—

Figure 17:
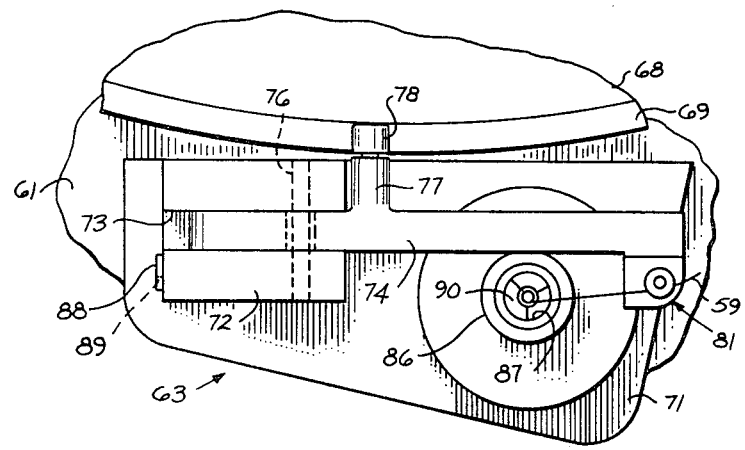
Figure 18:
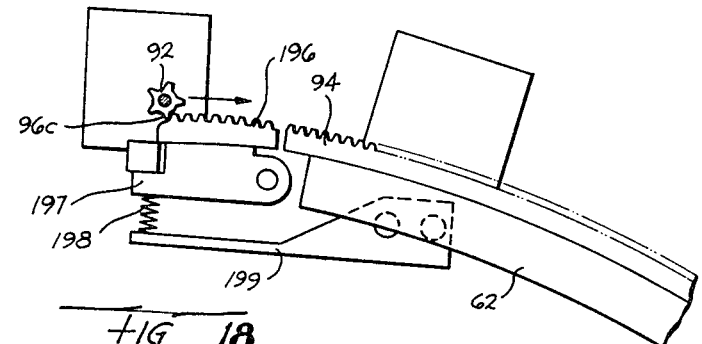
Figure 24:
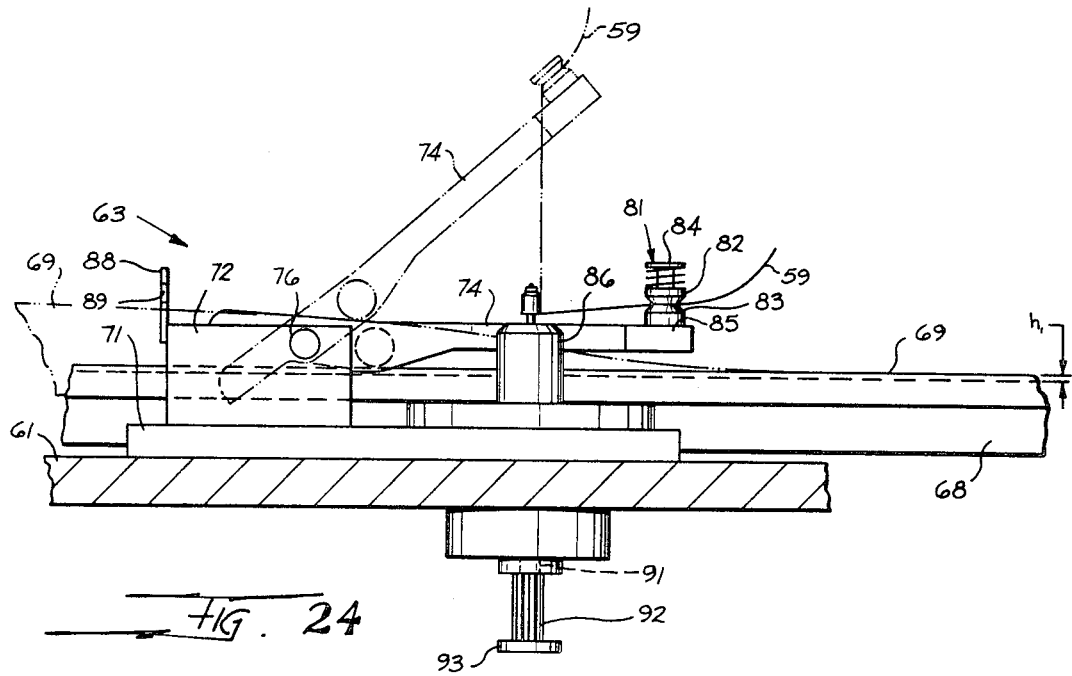
Figure 19:
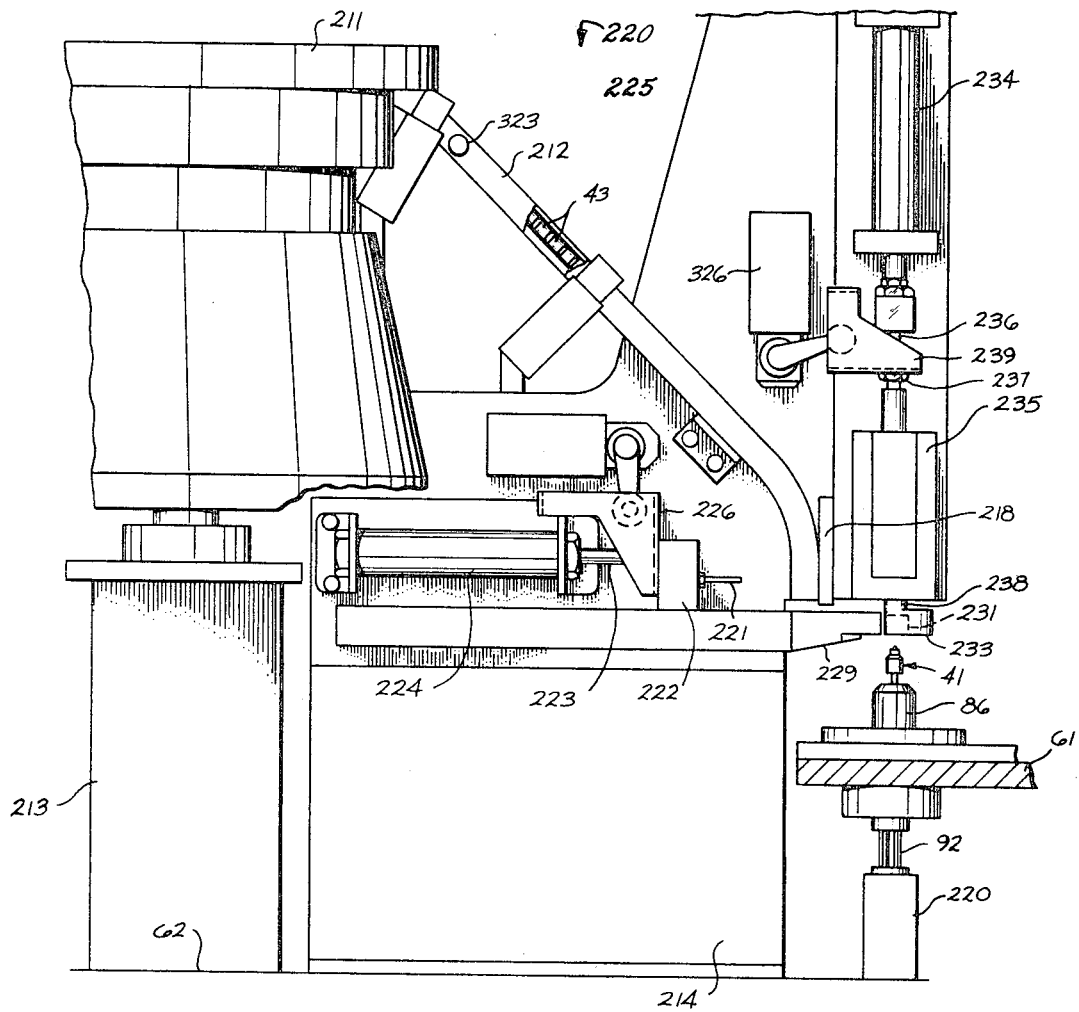
Figure 20:
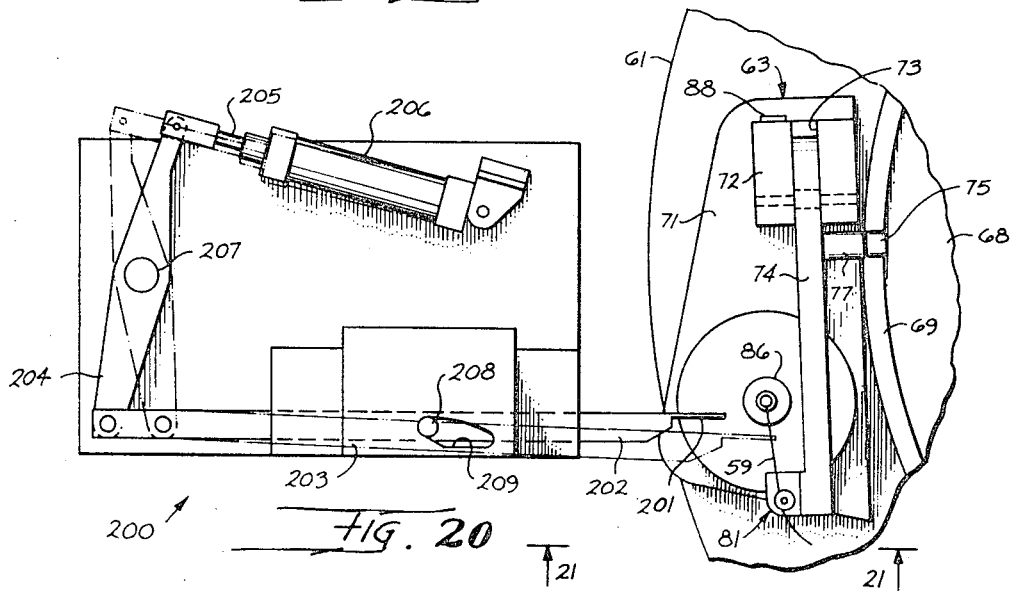
Figure 21:
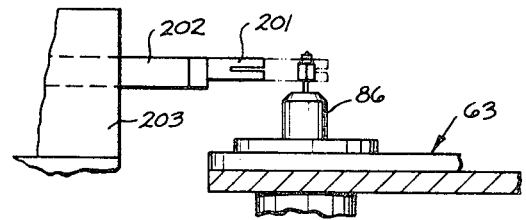
Figure 22:
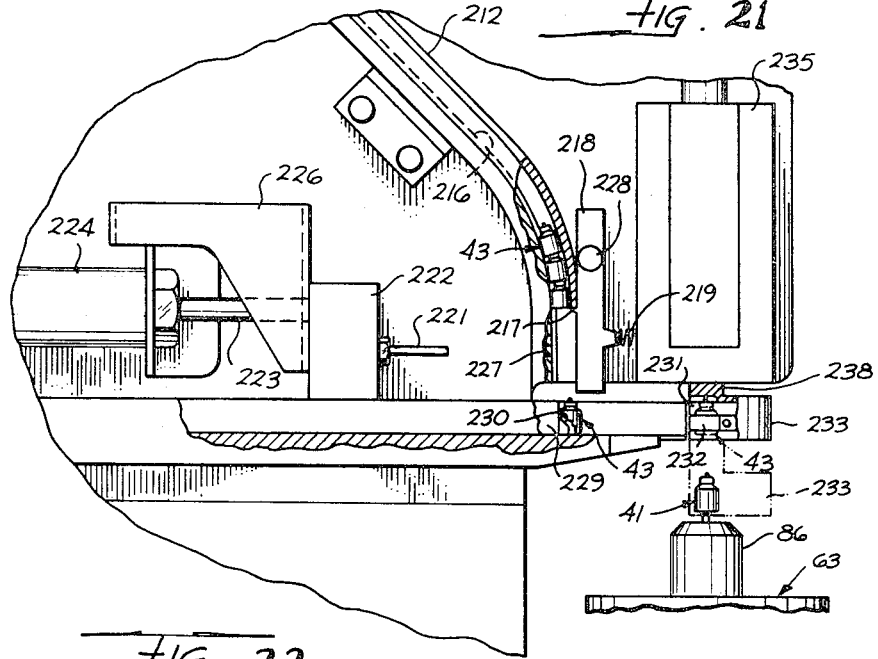
Figure 23:
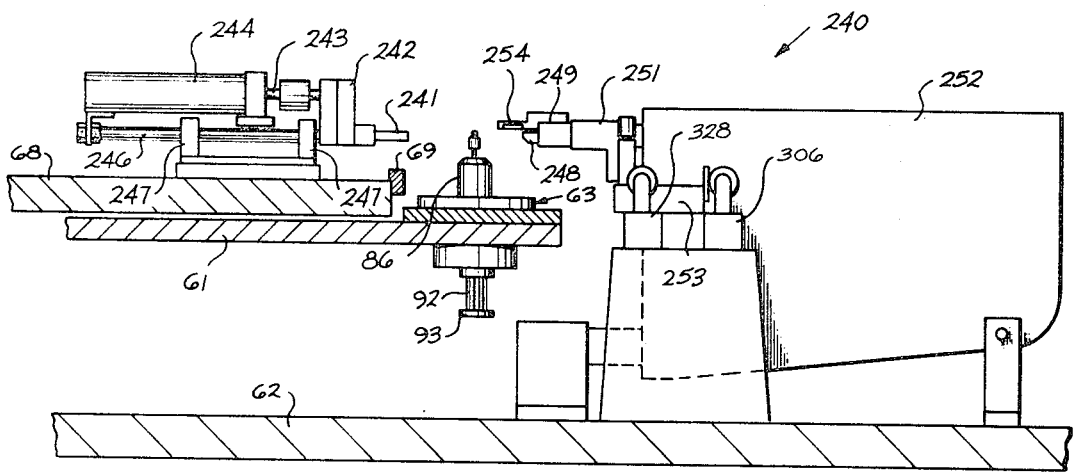
Figure 27:
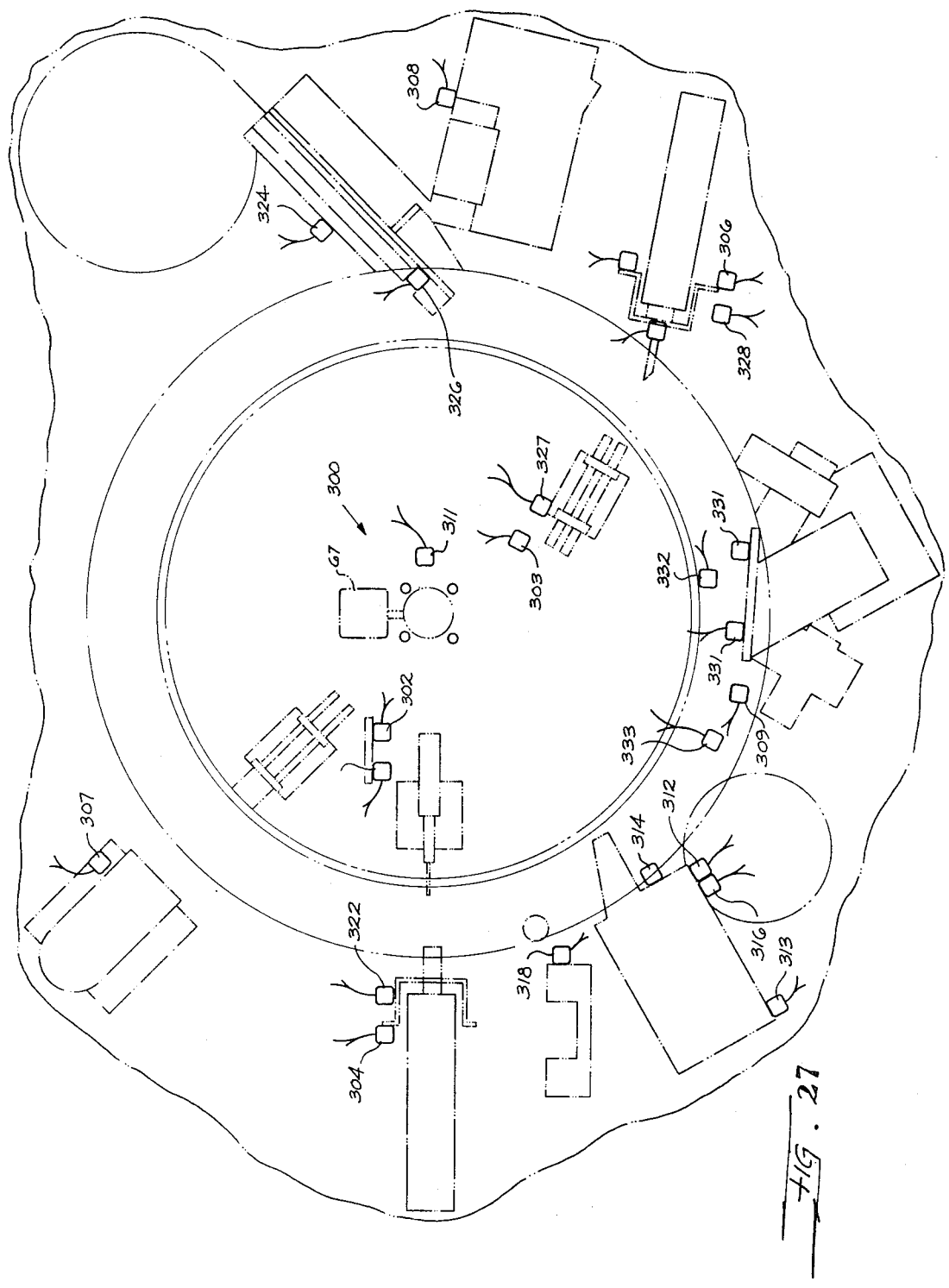

16 thereof which illustrates a device for swaging the upper peripheral rim of the sleeve of each of the pin and sleeve subassemblies to slope the rim inwardly;

FIG. 17 is an enlarged plan view of one of the workholders which is arrayed about the circumferential peripheral edge of the turntable and having a pivotally mounted arm for distributing the wire around the sleeve of a pin and sleeve subassembly as the arm is moved pivotally by a cam follower which rides on a contoured cam surface on a platform;

FIG. 18 is a detailed plan view showing the engagement of the pinion on the shaft extending from the chuck of each of the workholders with the rack on the underside of the turntable to rotate the chuck and the pin and sleeve subassembly held therewithin to wind the convolutions of wire on the sleeve as the distributor arm is moved pivotally;

FIG. 19 is an enlarged sectional view of a shell subassembly feeding an assembly device at a combined shell assembly and stripping station of FIG. 2 taken along line 19—19 thereof which illustrates a device for feeding successive ones of a mass of shell and cap subassemblies into alignment with, and then assembling the shell and cap subassemblies to, successive ones of the pin and sleeve subassemblies;

FIG. 20 is an enlarged plan view of a stripping device at the shell assembly and stripping station shown in FIG. 19 and the apparatus shown in FIG. 2 whereat the insulation is stripped from a portion of the conductor wire extending from each of the pin and sleeve subassemblies;

FIG. 21 is a detailed elevational view of the stripping device of FIG. 20 taken along line 21—21 thereof which illustrates in broken lines the actuated position of a stripping blade to engage with the insulation of a portion of the length of wire extending from the pin and sleeve subassembly in a chuck of the workholder;

FIG. 22 is an enlarged elevational view of a portion of the shell subassembly feeding and assembly device of FIG. 19 for the escapement of the shells into a shell placement slide;

FIG. 23 shows an enlarged sectional view of a welding and weld test station of the apparatus of FIG. 2 taken along line 23—23 thereof and illustrating a welding device for welding a portion of the wire extending from the pin and sleeve subassembly to the cap of the shell and cap subassembly which is assembled to the pin and sleeve subassembly and being provided with facilities for testing the strength of the weld upon the return movement of the welding device to an unoperated position;

FIG. 24 is an enlarged elevational view of one of the workholders of the apparatus of FIG. 2 taken along line 24—24 thereof and illustrating the upward movement of the distributor arm on the workholder to push a portion of the wire extending from the pin and sleeve subassembly in approximate engagement with the cap of the shell and cap subassembly assembled to the pin and sleeve subassembly which is positioned in the workholder to facilitate welding of the wire to the cap;

FIG. 25 is an enlarged perspective view of the facilities provided at the welding and weld test station of FIG. 23 in accordance with the principles of this invention for testing the weld of the wire to the cap of the shell and cap subassembly in which a pawl is moved pivotally by the magnetic field which is established during the weld to engage the wire and impart a pulling force thereto to test the strength of the weld of the wire to the cap;

FIG. 26 in an enlarged sectional view of a testing and sorting device of the apparatus of FIG. 2 taken along line 26—26 thereof and illustrating a device for removing successive ones of the heat coils from the workholders and for testing and then sorting the successive ones of the heat coils; and FIG. 27 is a plan view of the turntable and the platform shown in FIG. 2 and illustrating various limit switches which are positioned on the turntable and the platform for controlling automatically the operation of the assembly apparatus.

DETAILED DESCRIPTION

Referring now to FIG. 1, there is shown a heat coil assembly, designated generally by the numeral 41, which is to be tested by the methods of this invention. The heat coil assembly 41 includes a pin and sleeve subassembly 42 and a shell and cap subassembly 43. As can be seen in FIG. 3, the pin and sleeve subassembly 42 includes a pin 44 having a knurled end 46 and a pointed end 47. The pin 44 is soldered with a low melting temperature alloy, such as a bismuth mixture, in a sleeve 48 with the pointed end 47 protruding slightly from one end of the sleeve. The knurled end 46 extends some distance from the other end of the sleeve 48. Each of a mass of the pin and sleeve subassemblies 42—42 is assembled with one of a mass of the shell and cap subassemblies 43—43 so that the knurled end 46 is received in a recess in a closed end 49 (see FIG. 8) of a housing or shell 51.

The shell 51 is cylindrically shaped, having an open end 52 at one end thereof, and may be constructed of any suitable material, such as a plastic. The shell 51 is also formed with a slot 53 parallel with the longitudinal axis of the shell. The other closed end 49 of the plastic housing 51 has a beveled portion 54 which connects the cylindrical portion of the housing with the closed end. Moreover, a solder-plated brass cap 56 is received over the closed end 49 and is attached to the plastic shell 51 by protrusions 57 in the cap being received in indentations in the shell 51 (see FIG. 1).

Prior to the assembly of the pin and sleeve subassembly 42 with the shell and cap subassembly 43, one end of an insulated conductor wire 59 extending from a supply has the insulation removed therefrom and is welded to the sleeve 48 of the pin and sleeve subassembly (see FIG. 4). Then a portion of the wire 59 extending to the pin and sleeve subassembly 42 is severed (see FIG. 5) from the supply and the new leading end of the wire is attached to the pin and sleeve subassembly in the next succeeding workholder while maintaining the trailing part of the wire taut, and an upper rim of the sleeve 48 is swaged (see FIG. 6). The pin and sleeve subassembly and the workholder are rotated and an insulated portion of the conductor wire 59 is wound around the sleeve 48 (see FIG. 7). Subsequently, the insulation is removed from another portion of the length of wire and one of the pin and sleeve subassemblies 42—42 is assembled with the shell and cap subassembly 43 with the knurled end 46 received in the closed end 49 and with the other unwound part of the conductor wire extending through the slot 53 in the shell 51 (see FIG. 7). Then, the portion of the conductor wire 59 is welded to the cap 56 (see FIG. 8), after which the strength of the weld of the wire to the cap is tested.

GENERAL OVER-ALL DESCRIPTION OF THE APPARATUS

Figure 15:
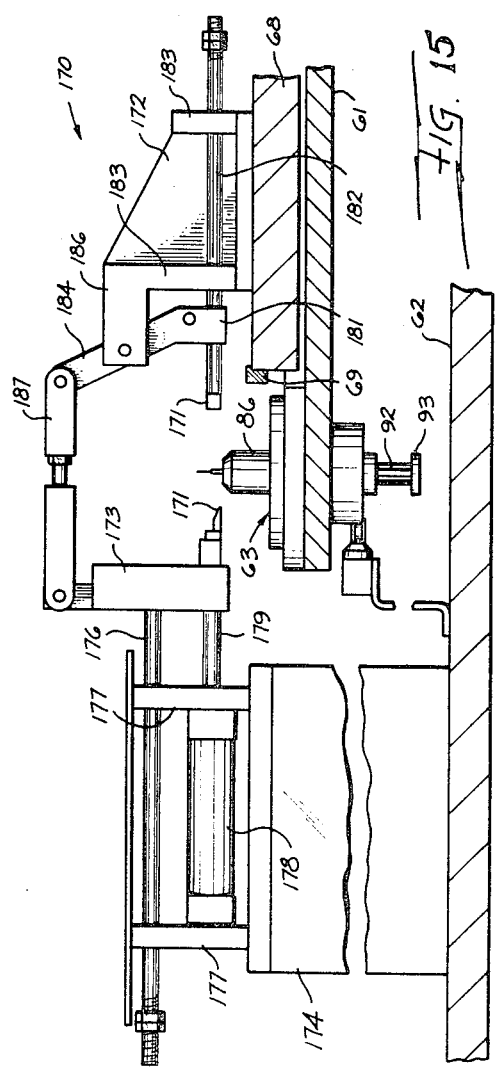
FIG. 15 is an enlarged sectional view of a cutting station of the apparatus of FIG. 2 taken along line 15—15 thereof which illustrates a device for severing the wire extending from the weld thereof to the sleeve of the pin and sleeve subassembly in a leading workholder to the supply spool and with a new leading end of the conductor wire being welded to the sleeve of the succeeding one of the pin and sleeve subassemblies.

An apparatus, designated generally by the numeral 60 (see FIG. 2), for assembling the heat coil assembly 41 which is to be tested in accordance with the principles of the methods of this invention includes a turntable 61 which is mounted rotatably on a base 62 (see FIG. 10) and which has a plurality of work stations arrayed about the periphery thereof. Moreover, the turntable 61 also has a plurality of workholders 63—63 attached to the turntable around the periphery thereof. At a first station (station No. 1, FIG. 2), a feeding device, designated generally by the numeral 100, (see FIG. 10), feeds successive ones of a mass of the pin and sleeve subassemblies 42—42 (see FIG. 3) into successive ones of the workholders 63—63. Then a leading one of the workholders 63—63 is moved with the turntable 61 to a second work station (station No. 2, FIG. 2) where a stripping blade 141 (see FIG. 12) strips a leading end of the insulated wire 59 and a welding device 150 (see FIG. 13) welds the bared leading end to the sleeve 48 (see FIG. 4) of the pin and sleeve subassembly 42. As the turntable 61 is moved rotatably into a third work station (station No. 3, FIG. 2), the wire 59 extends from the pin and sleeve subassembly 42 to a supply 64 of the wire. At the third work station a cutting device, designated generally by the numeral 170, (see FIG. 15), severs a length of the wire 59 extending to the pin and sleeve subassembly 42 (see FIG. 5) in the workholder 63 from the supply 64 with the new leading end of the wire 59 attached to the sleeve 48 of the pin and sleeve subassembly 42 in the next succeeding workholder 63. The workholder 63 is advanced to a fourth work station (station No. 4, FIG. 2) where a swaging device, designated generally by the numeral 190 (see FIG. 16), turns an upper rim of the sleeve 48 inwardly (see FIG. 6). The workholder is indexed through a fifth work station and the pin and sleeve subassembly 42 is rotated to wind the length of wire 59 on the sleeve 48 (see FIG. 7) while tensioning the length of wire extending from and secured to the pin and sleeve subassembly 42. At a sixth work station (station No. 6, FIG. 2) a stripping device 200 (see FIG. 20) removes the insulation from a portion of the wire extending from the pin and sleeve subassembly 42, (see FIG. 7), and a feeding device, designated generally by the numeral 210 (see FIG. 19), places a plastic shell 51 over the knurled end 46 of the pin and sleeve subassembly 42 (see FIG. 8). Then the heat coil assembly 41 is moved to a seventh work station (station No. 7, FIG. 2) whereat a welding device, designated generally by the numeral 240, (see FIG. 23), welds the portion of the wire 59 to the cap 56 (see FIG. 9) whereafter the strength of the weld to the cap is tested in accordance with the principles of the invention. Finally, the turntable 61 is indexed to position the heat coil assembly 41 at a final work station (station No. 8, FIG. 2). A testing and sorting device, designated generally by the numeral 260, determines an electrical test characteristic of the heat coil assembly, after which the heat coil assembly is ejected therefrom and sorted in accordance with the test characteristic.

The apparatus 60 is described in detail in U. S. Pat. No. 3,618,204 of which this application is a divisional. Also, in describing the operation of the apparatus 60 for assembling the heat coil assemblies 41—41, reference is made to FIG. 27 which shows various limit switches for controlling the operation of the apparatus.

CONVEYOR

Referring now to FIG. 2, there is shown a conveyor, designated generally by the numeral 65, which includes the turntable 61. The turntable 61 is secured to a shaft 66 and is moved rotatably intermittently and successively in a clockwise direction, as viewed in FIG. 2, by a continuously operated drive motor 67. The turntable 61 is spaced from the base 62 (see FIG. 10). Moreover, a stationary, circular top worktool platform 68 of a diameter less than the turntable 61 is mounted on the base 62 and is concentric with the turntable (see also FIG. 13). The workholders 63—63 may be spaced about the periphery of the turntable 61.

The top of the platform 68 has an annular cam surface 69 (see FIGS. 2 and 13) concentric with the platform and adjacent the peripheral edge of the platform. The annular cam surface 69 has a height (h) (see FIG. 13) which varies along the circumference thereof to present a contoured or cam surface which is used in the winding operation of the wire 59 to distribute the wire on the pin and sleeve subassembly 42 and which will be hereinafter described in detail.

Referring now to FIGS. 2 and 17, it can be seen that each of the workholders 63—63 includes a base plate 71 having a block 72 attached thereto at one end. The block 72 has a longitudinal channel 73 formed therethrough for receiving one end of a distributor arm 74. The distributor arm 74 is pivotally mounted at one end thereof to the block 72 by a pin 76 with the other end of the distributor arm extending from the channel 73 in a direction opposite to the clockwise rotary movement of the turntable 61.

The distribution arm 74 is assembled with a protruding portion 77 which extends radially inwardly from the distributor arm toward the top circular platform 68. A cam follower 78 is mounted rotatably on the protruding portion 77 and engages the annular cam surface 69 of the top circular platform 68. In this way, the cam follower 78 supports the unpinned other end of the distributor arm 74 and, as the turntable 61 is moved rotatably about the stationary platform 68, the cam follower rides on the cam surface 69 to move pivotally the distributor arm 74 in accordance with the configuration of the cam surface.

Moreover, the unpinned other end of the distributor arm 76 is equipped with a tensioning device 81 (see FIG. 24) for receiving and tensioning the wire 59.

Each of the workholders 63—63 includes a guide 88 having a V-shaped opening 89 and mounted on a leading end of the block 72 (see FIG. 17). As can best be seen in FIG. 2, a chuck 86 and the guide 88 are arranged on the workholder 63 so that the length of the wire 59 strung between the V-shaped opening 89 and engaging the tensioning device 81 is substantially linear and engages the top portion of the circumferential surface of the sleeve 48 of the pin and sleeve subassembly 42 held in the chuck 86 (see also FIG. 4).

The chuck 86 has an opening formed between a plurality of jaws 90—90 (see FIG. 31) for receiving the pointed end 47 of the pin 44 and for holding the pin in an upright position with the knurled end 46 extending upwardly. The jaws 90—90 are attached to a shaft 91 which extends downwardly through an opening in the turntable 61 and which is spring biased in an upward direction. In this way, the jaws 90—90 are normally biased upwardly to cam against the wall of the opening in the housing 87 of the chuck 86 to maintain the jaws in a closed position. As the shaft 91 is moved downwardly, the jaws 90—90 are drawn downwardly and are cammed against the wall of the housing 87 to open the jaws to permit insertion of a pin and sleeve subassembly 42.

The chuck 86 of the workholder 63 is also secured to the shaft 91 (see FIGS. 10 and 24) which is mounted rotatably through the base plate 71 and the turntable 61 in order to move rotatably the pin and sleeve subassembly 42 held on the chuck to wind the wire 59 on the sleeve 48. The shaft 91 has a pinion 92 formed on the lower end thereof and has a collar 93 attached thereto just below the lower end of the pinion 92. As the turntable 61 is indexed, the pinion 92 engages with a rack 94 (see FIG. 18) to turn the shaft 91 and rotate the chuck 86 and the pin and sleeve subassembly 42 which is held between the jaws 90—90 of the chuck. The cam follower 78 of the distributor arm 74 rides on the contour of the annular cam surface 69 (see FIG. 17) to move pivotally the distributor arm about the pin 76 to distribute the wire on the pin and sleeve subassembly 42 which is rotated with the chuck 86 by the cooperation between the pinion 92 and the rack 94.

PIN AND SLEEVE SUBASSEMBLY FEEDING STATION

Referring now to FIGS. 2, 10 and 11, there is shown the pin and sleeve subassembly feeding device 100 and includes a frame 101 and any commercially available vibratory bowl feeder 102 operated to move the pin and sleeve subassemblies 42—42 along a ledge 103 to a feed opening 104 formed in the ledge.

The opening 104 overlies a reciprocally movable slide 106 which is moved radially outward from the turntable 61 toward the bowl feeder 102 so that a receiving slot 107 in the slide receives the leading one of the pin and sleeve subassemblies 42—42. Then, the slide 106 is moved radially inward of the turntable 61 away from the bowl feeder 102 so that a solid portion 108 of the slide now underlies the opening 104 and supports the remaining pin and sleeve subassemblies 42—42 in the opening and the receiving slot is positioned over a pin 109 (see FIG. 11).

The pin 109 is used to orient the pin and sleeve subassemblies 42—42 which drop vertically by gravity and come to rest on the pin.

Regardless of the longitudinal orientation of the pin and sleeve subassembly 42 within the receiving slot 107, the pin and sleeve subassembly pivots about the pin so that the heavier pointed end 47 of the pin 44 is always oriented downwardly. Each subassembly 42 drops vertically downward first through a passage 111 and then into and through a chute 112, into a funnel 113 and into a nest 114 formed in a second slide 116 (see FIGS. 10 and 11).

The second slide 116 is reciprocally movable by an air cylinder 117 (see FIG. 10) to position successively each of the pin and sleeve subassemblies over one of the chucks. Moreover, the nest 114 in the slide 116 is formed between fingers 118—118 (see FIG. 11) biased by lugs 119 to clamp one of the pin and sleeve subassemblies 42—42 therebetween.

As can best be seen in FIGS. 10 and 11, the slide 116 is formed with one end having tapered camming surfaces 115—115 which are used to control the escapement of the pin and sleeve subassemblies 42—42 from the slide 106 into the opening 111. Normally, the slide 106 is biased to the right, as viewed in FIG. 11, by a pivotally mounted rod 105 which has one end protruding into an opening in the slide and which has the other end urged in a clockwise direction, as viewed in FIG. 11, and into engagement with one of the camming surfaces 115—115 by a compression spring 110. When the slide 116 is moved to position the pin and sleeve subassembly 42 held in the nest 114 thereof over one of the chucks 86—86, one of the camming surfaces 115—115 is cammed against the lower follower end of the rod 105 to move pivotally the rod in a counterclockwise direction, as viewed in FIG. 11, to move the slide 106 to the left to align the receiving slot 107 with the opening 104. The alignment of the receiving slot 107 with the opening 104 permits the lowermost one of the pin and sleeve subassemblies 42—42 to drop into the receiving slot with the remaining pin and sleeve subassemblies supported on the pin and sleeve subassembly in the receiving slot. Then, when the slide 116 is moved retractably away from the chuck 86, the follower end of the rod 105 rides along one of the tapered camming surfaces 115—115 to permit the spring 110 to urge the rod in a clockwise direction. As the rod 105 is moved in a clockwise direction, the slide 106 is advanced to the right, as viewed in FIG. 11, to align the receiving slot 107 with the opening 111 and to allow the pin and sleeve subassembly to drop downwardly into engagement with the pin 109 and then into the chute 112.

As the slide 116 is moved over the chuck 86 of the workholder 71, currently positioned in registration with the feeding device 100, an arm 120 actuates a limit switch 313 (see FIGS. 10 and 27) to operate an air cylinder 122. An air operated plunger 121 is moved downwardly by the air cylinder 122, acting through a rod 123 slidably secured in a sleeve 124. The plunger 121 imparts a pushing force to the pin and sleeve subassembly 42 and thereupon move the fingers 118—118 away from one another as the plunger continues to move downwardly and push the pin and sleeve subassembly through the nest 114 in the slide 116 and into the chuck 86 with the knurled end 46 of the pin 44 oriented upwardly (see FIG. 3). Simultaneously therewith, an air cylinder 126 is actuated to move a piston rod 127 and a block 128 downwardly, as viewed in FIG. 10, to impart a pulling force through a plate 129 against the collar 93 to move the shaft 91 downwardly. As the shaft 91 is moved downwardly, the jaws 90—90 in the chuck 86 are opened to permit the pin and sleeve subassembly 42 to be received in the opening therebetween.

The jaws of the chuck 86 are spring returned to a closed position. Limit switches are operated to cause the slide 116 and the ram 121 to be returned to initial positions.

WIRE FEEDING AND WELDING STATION

The pin and sleeve subassembly 42 in a leading one of the workholders 63—63 is indexed into a second work station of the apparatus 60 whereat a wire feeding and a welding device, designated generally by the numerals 130 and 150, respectively, (see FIG. 2), removes the insulation from a leading end of an insulated wire 59 and then welds the leading bared end to a top circumferential portion of the sleeve 48 of the pin and sleeve subassembly.

Figure 12:
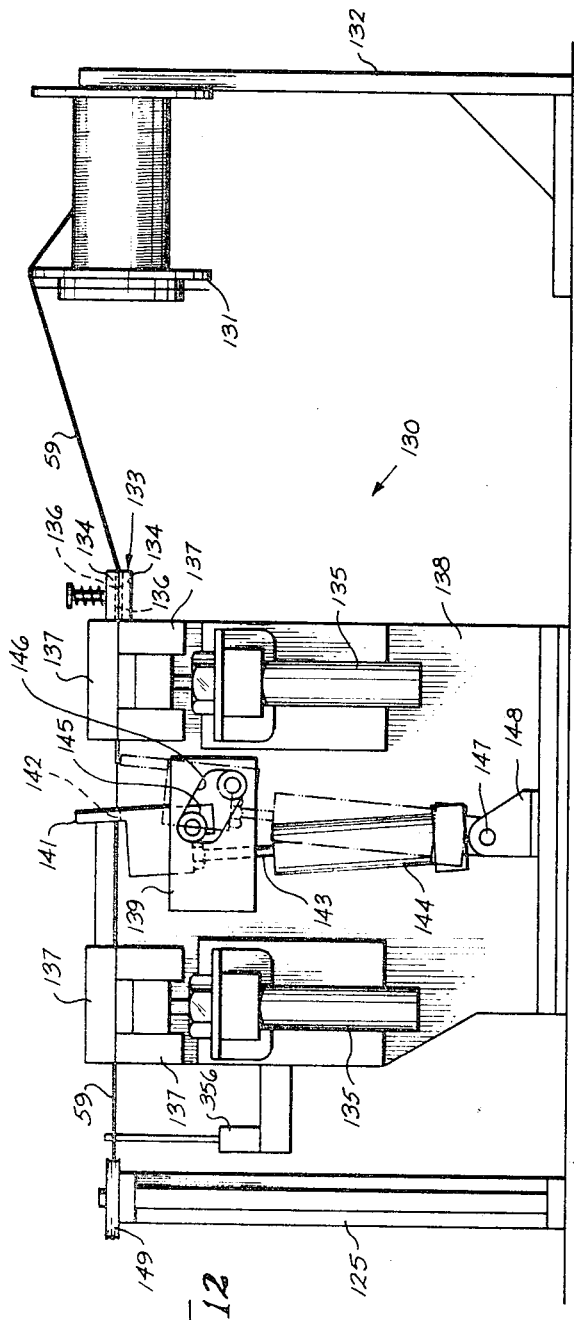
FIG. 12 is an enlarged sectional view of a conductor wire feeding station of the apparatus of FIG. 2 taken along line 12—12 thereof illustrating the conductor wire being payed out from a supply spool and advanced through a stripping device wherein predetermined portions of the conductor wire are bared of the insulation.

Referring now to FIG. 12, there is shown the wire feeding and stripping device 130 which includes a spool 131 of the insulated wire 50 mounted for rotation on a stanchion 132. The insulated wire 59 is advanced through a spring-loaded guide block 133 having a pair of plates 134—134, each of which has a groove 136 formed therebetween for receiving the wire. The wire 59 is then advanced under a pair of spaced hold-down bars 137—137.

In order to strip spaced portions of the continuous insulated wire 59 a stripping blade 141 is mounted on a rod 143 which extends from a cylinder 144. The rod 143 has a cam follower 145 for following a cam opening 146 in a plate 139.

As the wire 59 is advanced under the hold-down bars 137—137, the stripping blade 141 is moved to strip a predetermined portion "L" (see FIGS. 4 and 12) from the wire. The wire 59 is then advanced continuously around a guide sheave 149.

The predetermined length of bared wire "L" is spaced along the continuous length of the wire 59 so that, as each of the chucks 86 on the workholders 63—63 is advanced into registration with the welding device 150, one of the predetermined lengths "L" of bared wire is in engagement with the top portion of the sleeve 48 of the pin and sleeve subassembly 42 held in the workholder 63 currently in registration with the welding device (see FIG. 4).

The welding device 150 includes an anvil electrode 151 and a welding electrode 152 which are spaced apart and which are movable into engagement with the pin and sleeve subassembly 42 and with the bared exposed portion "L" of the wire 59. As the electrodes 151 and 152 engage the sleeve 48 and press the bared portion "L" of the wire 59 against the sleeve 48, the welding device is operated to secure the bared portion to the sleeve 48.

The electrode 152 is supported on a carriage 153 which is moved slidably inward toward the turntable 61 by an air cylinder 155 to engage the welding electrode 152 with the bared length "L" of the wire 59. The carriage 153 also has a bracket 156 for actuating a limit switch 322 and a limit switch 304 which are used in controlling the operation of the apparatus 60 (see FIG. 27).

The welding electrode 152 is formed with a concave surface 160 having aligned slots 165—165 extending transversely thereof to facilitate engaging the wire 59 between the welding electrode and the sleeve and to align vertically the wire on the sleeve 48.

Referring again to FIG. 13, it can be seen that the anvil electrode 151 is attached to a carriage 157 having a rod 158 which is mounted slidably in a pair of spaced bearings 159—159 that are supported on the platform 68. One end of the rod 158 has a plate 161 for actuating either of a pair of spaced limit switches 321 and 302 (see also FIG. 27).

The movement of the welding electrode 152 actuates the limit switch 322 to control the anvil electrode 151 which subsequently controls the welding electrode to be returned. The retraction of the electrode 152 actuates limit switch 304 to return the anvil electrode 151 which engages limit switch 302 to condition the apparatus for another cycle of operation.

Moreover, the second work station also includes a pinion orienter 166, (see FIG. 14) mounted on the base plate 62 of the apparatus 60 in alignment with the welding device 150.

In order for the gear teeth 96—96 of the pinion 92 secured to the shaft 91 (see FIG. 13) to engage correctly with the rack 94 at a subsequent station in order to rotate the chuck 86, it is necessary that the shaft 91 be oriented so that a leading one 96 of the gear teeth 96—96 of the pinion will correctly engage the rack teeth of the rack 94. Should the pinion 92 be oriented incorrectly, the gear teeth 96—96 may jam against the rack 94 as the turntable 61 is indexed to engage the pinion with the rack.

As can best be seen in FIG. 14, the pinion orienter 166 includes a pivotally mounted lever arm 167 having a bossed end 168 biased by a spring 168 into engagement with an adjustably settable stud bold 169. As the turntable 61 is moved indexably to position one of the workholders 63—63 in registration with the welding device 150 then, should the pinion 92 associated with that particular workholder 63 be oriented properly, the gear teeth 96—96 on the pinion 92 are spaced and simply moved slidably along the surface of the bossed end 168 (see FIG. 14). However, should one of the teeth 96—96 of the pinion 92, which is farthest from the center of the turntable 61, be oriented in a direction along the radius of the turntable (see tooth 96a of the pinion 92 shown in broken lines, FIG. 14), then the tooth 96a engages the edge of the bossed end 168 to rotate slightly the pinion, the shaft 91 and the chuck 86 in a counterclockwise direction, as viewed in FIG. 14, until the next adjacent tooth (tooth 96b, FIG. 14) slides along the surface of the bossed end.

SEVERING STATION

At the next station, the sleeve 48 of the pin and sleeve subassembly 42 is positioned between a pair of opposed, spaced cutting blades 171—171 of the severing device 170. One of the cutting blades 171—171 is supported from a frame 172; the other one of the cutting blades 171—171 is mounted on a reciprocally movable carriage block 173 which is mounted on a stand 174 that is attached to the base 62.

Similarly, the one cutting blade 171 is mounted on a carriage block 181 that is attached to a forward end of a pair of spaced rods 182—182 which are slidably mounted in a pair of spaced plates 183—183 of the frame 172. Moreover, the block 181 is attached to one end of a pivotally mounted arm 184. The arm 184 is pivotally mounted at a center point thereof between a pair of spaced ears 186—186 which project from an upstanding portion of one of the spaced plates 174—174. The other end of the pivot arm 184 is pinned to an actuator rod 187 pinned to an upstanding portion of the carriage block 173.

As the block 173 is moved toward the turntable 61, the actuator rod 187 causes the carriage block 181 and cutting blade 171 mounted thereon to be moved inwardly toward the pin and sleeve subassembly 42 in the workholder 63 currently in position in the severing station. The cutting blades 171—171 cooperate to sever the bared end of the wire 59 on the leading (or clockwise) side of the pin and sleeve subassembly 42. After the wire 59 has been severed (see FIG. 6), the workholder 63 currently in the severing station has a pin and sleeve subassembly 42 held in the chuck 86 thereat with the bared end of the wire 59 welded to the sleeve 48 of the pin and sleeve subassembly and with the wire extending counterclockwise thereof past the pin and sleeve subassembly in the chuck currently in the wire feeding and welding station with the wire 59 continuing thereon to the supply spool 131.

SWAGING STATION

After the wire 59 has been severed from the leading side of a pin and sleeve subassembly 42 which is held in the workholder 63 in the third work station, the workholder is indexed to move the pin and sleeve subassembly into a fourth work station and into registration with a swaging tool, designated generally by the numeral 191 (see FIG. 16).

It will be recalled that the pin and sleeve subassembly 42 has been formed prior to the assembly thereof with the shell and cap subassembly 43 in the apparatus 60 and has a somewhat flared peripheral edge on the upper portion of a sleeve 48. The flared peripheral edge of the sleeve 48 curves outwardly and must be swaged inwardly to conform generally with the surface of the cylindrical sleeve.

The swaging tool 191 has a die cavity 194 concentric with the outer circumference of the sleeve 48. Moreover, the innermost portion of the die cavity 194 is rounded so that as the swaging tool 191 is moved downwardly over the sleeve 48, the curved outer rim portion of the sleeve is swaged inwardly by the wall of the die cavity.

As the swaging tool 191 is moved to swage the rim of the sleeve, the cutting blades 171—171 are moved to sever the wire 59 from the supply spool 131. Consequently, at this time, the pin and sleeve subassembly 42 currently in registration with the swaging device 190 has a leading bared end of a wire 59 welded to the top portion of the sleeve 48 and has a predetermined length of insulated wire 59 extending in a generally counterclockwise direction with a trailing portion thereof held tensioned between the stud 82 and the boss 85 of the distributor arm 74.

WIRE WINDING

The rack 94 is positioned on the base 62 so that the pinion 92 on the shaft 91 of each of the workholders 63—63 engages initially the teeth of the rack when the workholder is moved out of registration with the swaging device 190 to rotate the shaft and the chuck 86. (See FIG. 18.)

As can be observed from FIG. 18, the rack 94 has a lead-in segment 196 which is attached to a pivotally mounted bar 197. The bar 197 is biased in a clockwise direction, as viewed in FIG. 18, by a spring 198 bearing on a lever 199 that is secured to the base plate 62. By this arrangement, the lead-in segment 196 yields and is moved pivotally in a counterclockwise direction should one of the teeth 96—96 (tooth 96c in FIG. 18) approach the rack segment so as to jam thereagainst. The yielding motion of the lead-in segment 196 facilitates the meshing of the pinion 92 with the rack 94.

The annular cam surface 69 varies from a height slightly above the level of the platform 68 from the first to the fourth work stations and then to a minimum winding height and back to a maximum winding height $h_1$ as the turntable is indexed from the fourth work station through a fifth work station and into a sixth work station at which ones of the mass of shell and cap subassemblies 43—43 are assembled to successive ones of the pin and sleeve subassemblies 42—42.

Moreover, the annular cam surface 69 is configured so that the height "$h$" (see FIG. 13) of the cam surface is decreased gradually starting at a point on the cam surface directly above the point of engagement of the pinion 92 with the rack 94. Subsequently, the cam follower 78 riding on the cam surface 69 is urged upwardly to move pivotally the tension arm 74 and overcome the spring 79 to raise the trailing end thereof upwardly and distribute the convolutions of the wire 59 on the sleeve 48 of the pin and sleeve subassembly 42. In this way the distributor arm 74 is moved pivotally first in a clockwise and then in a counterclockwise direction, as viewed from outside the turntable 61, to array two layers of the wire 59 on the sleeve 48 on each of the pin and sleeve subassemblies 42—42.

Also, it will be recalled that a stud 82 in the workholder 63 cooperates with the boss 85 formed on the one end of the distributor arm 74 to hold the insulated wire 59 between the stud 82 and the top portion of the arm 74. Now, since the trailing end of the wire 59 has been severed, the winding of the wire 59 on the sleeve 48 of the pin and sleeve subassembly 42 pulls the wire between the stud 82 and the boss 85 of the tension arm 74. In this way, the tension device 81 serves to guide the wire 59 extending from the pin and sleeve assembly 42 as the distribution of the wire is made on the sleeve 48 of the pin and sleeve subassembly 42.

As the turntable 61 is indexed into the sixth work station, the pinion 92 is disengaged from the rack 94 and the cam follower 79 now resumes following a portion of the cam surface 69 which is generally planar with the top surface of the platform 68. Hence, the distributor arm 74 remains in a generally constant orientation with a portion of the wire 59 which has been wound on the sleeve 48 held taut by the stud 82 at the trailing end of the arm.

SHELL ASSEMBLY AND WIRE STRIPPING STATION

Referring now to FIGS. 20 and 21, the stripping device 200 includes a cutting blade 201 similar to the cutting blade 141 and which is mounted on a reciprocally movable slide 202. Upon actuation of an air cylinder 206, a rocker arm 204 is turned clockwise direction, as viewed in FIG. 20, about a pin 207 to move slidably the stripping blade 201 inwardly to engage the insulated wire 59 and laterally to strip a predetermined length of insulation from the wire.

The shell subassembly feeding and assembling device 210 feeds successive ones of a mass of the shell and cap subassemblies 43—43 from a vibratory bowl feeder 211 (see FIG. 19) into position over successive ones of the pin and sleeve subassemblies 42—42 currently in registration therewith.

The shell and cap subassemblies 43—43 are moved along an inclined feed track 212 so that the open end 52 of each of the shells 43—43 is oriented toward the turntable 61, and are maintained with the slots 53—53 thereof in the desired orientation by virtue of a fin 216 which is attached to the inclined track 212.

In operation, after the leading one of the shell and cap subassemblies 43—43 comes to rest on a lip 217, a reciprocally movable escapement pin 221 is moved through an opening 227 in the feed track 211 to span the feed track and engage a lower end of a pivotally mounted escapement member 218 to pivot the escapement member in a counterclockwise direction about a pin 228, as viewed in FIG. 22, against the spring 219. The leading one of the shell and cap subassemblies 43—43 is released from the lip 217 and comes to rest on the pin 221.

Then as the escapement pin 221 is withdrawn to the left, as viewed in FIG. 22, and back through the opening 227 in the feed track 212, the escapement member 218 is moved pivotally in a clockwise direction, as viewed in FIG. 22, about a pin 228 by a spring 219 and the next successive one of the shell and cap subassemblies 43—43 comes to rest against the lip 217 thereof. The leading one of the shell and cap subassemblies 43—43, resting on the escapement pin 221, drops vertically downward upon withdrawal of the pin and comes to rest in an opening in a slide 229. The slide 229 has a fin 230 (see FIG. 22) extending into the opening and which represents a continuation of the fin 216 in the feed track 212 for maintaining the shell and cap subassemblies 43—43 in the desired orientation.

The slide 229 is attached to the block 222 so that as the air cylinder 224 is actuated to move slidably the pin 221 to the right, as viewed in FIG. 22, and radially inward toward the turntable 61, the leading one of the shell and cap subassemblies 43—43 in the opening in the slide is positioned over the pin and sleeve subassembly 42 in the chuck 86 currently in registration with the sixth work station. The radially inward movement of the slide 229 moves the shell and cap subassembly 43 into a nest 231 formed between opposed inwardly biased spring fingers 232—232 in lower portion of a block 233 aligned vertically with the chuck 86 and the bracket 226 trips limit switch 324 to complete a circuit (not shown) to retract the slide 229. The spring fingers 232—232 hold the shell and cap subassembly 43 in alignment with the chuck 86 upon withdrawal of the slide 229.

The block 233 is moved downwardly until the block engages a stop 237 which prevents further downward movement of the block. At that time the shell and cap subassembly 43 held within the nest 231 in the block 233 is positioned over, but not in engagement with, the pin and sleeve subassembly 42 in the chuck 86.

However, the stop 237 does not prevent further downward movement of an assembly ram 238 which is spring mounted on the block 233. The assembly ram 238 pushes the shell and cap subassembly 43 through the nest 231 in the block 233 into engagement with the pin and sleeve subassembly 42.

The operation of the air cylinders 206 and 234 is accomplished simultaneously so that while the stripping device is removing the insulation from a portion of the wire 59 extending from the sleeve 48, the slide 229 is simultaneously moved radially inward over and spaced above the chuck 86 to position a shell and cap subassembly 43 in the nest 231.

The pin and sleeve subassembly 42 with the wire 59 wound thereon is then in condition to receive one of the shell and cap subassemblies 43—43 by operation of the ram described hereinbefore.

As the cycle of operation of the stripping device 200 and the shell subassembly feeding and assembly device 210 is completed at the sixth work station, the pin and sleeve subassembly 42 has a wire 59 wrapped around the sleeve 48 thereof with a bared portion thereof extending through the slot 53 in the cylindrical plastic shell 51 (see FIG. 8) which has been placed over the pin and sleeve. In order to complete the assembly of the heat coil assembly 41, it is then necessary to weld the bared portion of the wire 59 extending through the slot 53 to the metal cap 56 on the now upwardly oriented portion of the shell 51 (see FIG. 9).

WELDING AND WELD TEST STATION

After one of the shell and cap subassemblies 43—43 has been assembled to the pin and sleeve subassembly 42 in one of the workholders 63—63, the turntable 61 is indexed rotatably in a clockwise direction to move the workholder into a seventh work station and into registration thereat with a welding and weld test device, designated generally by the numeral 240 (see FIG. 2). The welding and weld test device 240 welds the bared portion of the extending part of the wire 59 to the metal cap 56 on the plastic shell 51 and then tests the strength of the weld to the cap.

Referring now to FIG. 23, there is shown the welding and weld test device 240 which includes an anvil electrode 241 which is mounted on a slidably movable head 242 that is attached to an end of a piston rod 243 which is operated by an air cylinder 244. The air cylinder 244 is mounted on spaced carriage rods 246—246 supported in a pair of spaced bearing blocks 247—247 that are secured to the peripheral portion of the top platform 68.

The welding and weld test device 240 also includes a welding electrode 248 that is mounted on a head 249 of a reciprocally movable carriage 251. The reciprocally movable carriage 251 extends into a housing 252 that is attached to a top portion of the base plate 62. The spaced anvil and welding electrodes 241 and 248, respectively, are positioned so that the electrodes engage the metal cap 56 attached to the plastic shell 51 and the bared portion of the wire 59 to complete a circuit to weld the bared portion of the wire to the cap. Finally, the welding and weld test station includes an actuator bracket 253 which is attached to the reciprocally movable carriage 261 for actuating limit switches 306, 327 and 328 (see FIGS. 2 and 27) for controlling the operation of the apparatus 60.

Moreover, the carriage 251 also includes a cantilevered member 254 that extends above and over the welding electrode 248 (see FIGS. 23 and 25). The cantilevered member 254 has a slot 256 formed therein for receiving a pivotally mounted pawl 257. The pawl 257 normally extends outwardly (see broken line position of pawl in FIG. 25); however, the pivotal movement is limited to a stop (not shown) within the slot 256 so that an acute angle is formed between the pawl in the normal outward position and the cantilevered member 254. When the carriage 251 is moved longitudinally over the chuck 86 and transversely of the axis of the wire 59 to engage the welding electrode 248 with the wire, the pawl brushes past the length of the wire between the pin and sleeve subassembly 42 and the tensioning means 81 to move pivotally the pawl, in a counterclockwise direction, as viewed from a top plan view of FIG. 25, within the slot 256.

It should be observed from FIGS. 24 and 25 that the pawl 257 is capable of being moved pivotally by the wire 59 since, at this portion of the circular top platform 68, the cam surface 69 is raised substantially in contour to a maximum height above the surface of the platform, and above that height, at the conclusion of the winding operation, so that the distributor arm 74 is moved in a clockwise direction (as viewed in FIG. 24) to position the tension device 81 above the electrodes 241 and 248.

With the distributor arm 74 in an upper inclined position, the wire 59, extending from the slot 53 to the tensioning device 81, is at an inclined position so that a portion of the bared wire is adjacent to the metal cap 56 (see FIG. 25). Then, when the electrodes 241 and 248 are brought into welding position over the chuck 86, the anvil electrode 251 engages the cap 56 and the welding electrode engages the bared portion of a wire 59 and moves the bared wire into engagement with the cap 56, whereupon the welding circuit is completed to weld the wire to the cap.

As the bared portion of the wire 59 is welded to the cap 56, a magnetic field is established in the vicinity of the weld and utilized to test the strength of the weld. The establishment of the magnetic field attracts the pawl 257 to move pivotally the pawl out of the slot 256 to an outer normal position (see broken line position of pawl, FIG. 25). Then, after the weld has been completed and the anvil and welding electrodes 241 and 248, respectively, are withdrawn from the welding position, the carriage 251 is moved out from over the chuck 86. As the carriage 251 is withdrawn from the position over the chuck 86, the pawl 257, then in a normal outward position by virtue of the magnetic field, engages the wire 59 and exerts a pulling force on the wire. The force, imparted by the pawl 257 to the wire 59, is sufficient to break the wire at the point of weld (see FIG. 9). However, should the weld be defective, the wire 59 will not break at the weld, but rather the wire is pulled out of engagement with the cap 56. Hence, the welding and weld test device 240 performs a dual function in performing a test of the strength of the weld subsequent to the welding of the wire 59 to the cap 56 of the shell and cap subassembly 43.

After the remaining length of the bared portion of the wire 59 has been broken from the weld at the cap 56, there remains a short portion of the wire depending downwardly from the tension device 81 of the distributor arm 74 (see FIG. 25). It will be recalled that this portion of the wire is held confined between the stud 82 and the boss 85 on the distributor arm 74. This remaining portion of the wire 59 is removed at a subsequent work station following the ejecting of the heat coil assembly 41 from the apparatus 60.

TESTING AND SORTING STATION

After the bared portion of the wire 59 is welded to the cap 56, the turntable 61 is indexed rotatably in a clockwise direction to move the workholder 63 and chuck 86 to the final station and into registration with a testing and sorting device, designated generally by the numeral 260 (see FIGS. 2 and 26).

Then, as the chuck 86 is closed after the heat coil assembly 10 is released therefrom, the limit switch 309 is actuated to complete the all stations return circuit whereupon the index clutch (not shown) permits the turntable 61 to be rotated indexably for another cycle of automatic operation.

As the turntable 61 is indexed to move the workholder 63 currently positioned in registration with the testing and sorting station 260 toward the pin and sleeve subassembly feed device 100, the chuck 86 is moved adjacent to, but spaced below a limit switch 333 (see FIGS. 1 and 32). Should the heat coil assembly 41 not be removed from the workholder 63 at the testing and sorting device 260, the heat coil assembly engages and actuates the limit switch 333 to complete circuit paths in the electrical circuit (not shown) to discontinue operation of the welding device 240.

And, finally, as the turntable 61 is indexed to move the workholder 63 from the testing and sorting device 260 to the feeding device 100, a scrap wire discarding device 277 engages the tensioning device 81 to force open the groove therein to permit an air blast from a tube 279 to direct the scrap wire away from the workholder.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of testing the strength of a joint of a portion of a length of wire bonded to a part with a test device which includes the steps of:

holding the part with a length of the wire having a portion thereon bonded to the part;

supporting a section of the length of wire extending from the joint;

mounting a test device for transverse and longitudinal movement for engaging the section of the length of wire extending between the joint and the end of the wire;

moving the test device longitudinally in a path of travel transversely of the length of wire; and moving pivotally the test device transversely of the longitudinal path of travel so that when the test device is moved transversely and longitudinally of the wire, the test device exerts a pulling force against the wire of sufficient magnitude to test the joint and break the wire.

2. A method of testing the strength of a joint of a portion of a length of wire bonded to a part with a test device, which includes the steps of:

holding the part with a length of the wire having a portion substantially adjacent to the part;

mounting pivotally a test pawl on the test device;

mounting the test device for movement longitudinally and transversely of the length of the wire between the joint and the end of the wire;

advancing the test device in a path of travel transversely of the length of wire to engage the test device with the portion of the wire and to pivot the test pawl into a retracted position away from the axis of the wire;

establishing a magnetic field about the joint to attract magnetically the pawl into an extended position which projects transversely of the length of the wire; and retracting the test device to withdraw the pawl from beyond the wire and along a path which intersects the wire to impart a pulling force to the wire to break the wire at the joint of an acceptable joint of the wire and the part.

* * * * *